United States Patent
Raines et al.

(10) Patent No.: US 9,061,643 B1
(45) Date of Patent: Jun. 23, 2015

(54) ACTIVE BOLSTER WITH INTERLOCKING GAS BARRIER

(71) Applicant: FORD GLOBAL TECHNOLOGIES, LLC, Dearborn, MI (US)

(72) Inventors: Stacey H. Raines, Ypsilanti, MI (US); Sean B. West, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/482,002

(22) Filed: Sep. 10, 2014

(51) Int. Cl.
*B60R 21/05* (2006.01)
*B60R 21/205* (2011.01)
*B60R 21/04* (2006.01)
*B60R 13/02* (2006.01)

(52) U.S. Cl.
CPC ............. *B60R 21/04* (2013.01); *B60R 13/0206* (2013.01); *B60R 2021/0407* (2013.01); *B60R 2013/0287* (2013.01)

(58) Field of Classification Search
CPC ........ B60R 21/02; B60R 21/04; B60R 21/16; B60R 21/045; B60R 21/20; B60R 21/205; B60R 2021/024; B60R 2021/0407; B60R 13/0206; B60R 2013/0287
See application file for complete search history.

(56) References Cited

U.S. PATENT DOCUMENTS

| | | | |
|---|---|---|---|
| 5,141,577 A * | 8/1992 | Porchia et al. | 156/66 |
| 5,335,936 A * | 8/1994 | Faigle et al. | 280/728.2 |
| 5,535,571 A * | 7/1996 | Nichols | 52/716.6 |
| 5,613,706 A | 3/1997 | Parker et al. | |
| 5,932,832 A | 8/1999 | Hansen et al. | |
| 6,032,978 A | 3/2000 | Spencer et al. | |
| 6,082,759 A * | 7/2000 | Faigle et al. | 280/728.3 |
| 6,213,497 B1 | 4/2001 | Spencer et al. | |
| 6,265,097 B1 | 7/2001 | Konno et al. | |
| 6,688,643 B2 * | 2/2004 | Schneider | 280/753 |
| 6,758,493 B2 | 7/2004 | Conlee et al. | |
| 6,935,655 B2 | 8/2005 | Longhurst et al. | |
| 7,234,726 B2 | 6/2007 | Trevino et al. | |
| 7,556,285 B1 | 7/2009 | Hayashi | |
| 7,568,723 B2 * | 8/2009 | Remley et al. | 280/728.2 |
| 7,631,890 B1 | 12/2009 | Kalisz et al. | |
| 8,328,230 B1 * | 12/2012 | Kalisz | 280/730.1 |
| 8,448,985 B2 * | 5/2013 | Kalisz | 280/752 |
| 8,459,689 B2 * | 6/2013 | Roychoudhury | 280/730.1 |
| 8,474,868 B2 | 7/2013 | Kalisz et al. | |
| 8,474,917 B2 * | 7/2013 | Line et al. | 297/452.38 |
| 8,491,008 B2 * | 7/2013 | Roychoudhury et al. | 280/752 |
| 8,579,325 B2 | 11/2013 | Roychoudhury | |
| 8,720,948 B2 | 5/2014 | Raines et al. | |

(Continued)

*Primary Examiner* — Drew Brown
(74) *Attorney, Agent, or Firm* — Vichit Chea; MacMillan, Sobanski & Todd, LLC

(57) ABSTRACT

An active bolster for an automotive vehicle has a plastic-molded outer trim panel with a closed-loop welding section. A plastic-molded expandable bladder member has a central attachment section, a welding flange along a peripheral edge, and a pleated region between the central attachment section and the welding flange. The welding section and the welding flange are joined by a hot weld. An inflator couples an inflation gas into a space between the trim panel and bladder member to expand the bladder member in response to a crash event. The bladder member includes a first blocking rib projecting toward the trim panel between the welding flange and the pleated region. The trim panel includes a second blocking rib projecting toward the bladder member. The blocking ribs mechanically interlock to resist separation of the bladder member and trim panel during expansion and to shield the hot weld from the inflation gas.

5 Claims, 5 Drawing Sheets

(56) References Cited

U.S. PATENT DOCUMENTS

| | | | |
|---|---|---|---|
| 8,936,273 B1* | 1/2015 | Raines et al. ............... 280/753 |
| 2001/0019202 A1* | 9/2001 | Holdampf et al. ......... 280/730.2 |
| 2002/0008638 A1 | 1/2002 | Yamashita |
| 2002/0149179 A1* | 10/2002 | Holtz ....................... 280/728.3 |
| 2003/0047915 A1 | 3/2003 | Sun et al. |
| 2004/0155447 A1* | 8/2004 | Smith et al. ................ 280/753 |
| 2004/0212182 A1 | 10/2004 | Canterberry |
| 2004/0262889 A1* | 12/2004 | Roychoudhury ......... 280/728.2 |
| 2005/0052002 A1 | 3/2005 | Hayashi et al. |
| 2005/0230994 A1* | 10/2005 | Ward et al. ................. 296/39.1 |
| 2006/0082116 A1* | 4/2006 | Riefe et al. .................. 280/752 |
| 2006/0255569 A1 | 11/2006 | Weissert et al. |
| 2008/0048418 A1* | 2/2008 | Remley et al. ............ 280/728.2 |
| 2008/0100038 A1 | 5/2008 | Finch et al. |
| 2011/0148077 A1* | 6/2011 | Enders ...................... 280/728.2 |
| 2011/0272926 A1 | 11/2011 | Roychoudhury et al. |
| 2011/0316300 A1 | 12/2011 | Kalisz |
| 2012/0068441 A1 | 3/2012 | Kalisz |
| 2012/0112439 A1 | 5/2012 | Roychoudhury |
| 2012/0248741 A1 | 10/2012 | Kalisz |
| 2012/0267878 A1* | 10/2012 | Kalisz et al. ............. 280/728.2 |
| 2014/0084572 A1* | 3/2014 | Raines et al. .............. 280/743.1 |
| 2014/0145419 A1* | 5/2014 | Ishikawa et al. ........... 280/728.3 |

* cited by examiner

ACTIVE BOLSTER WITH INTERLOCKING GAS BARRIER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to increasing robustness of the bonding between an expandable bladder member and a trim wall which are separately molded.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner wall (i.e., bladder wall) may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

A known method of sealing the bladder walls is by hot welding, which involves heating of the matching surfaces and then compressing them together. Examples include hot plate welding, IR welding, and laser welding. A generally planar welding flange has been provided around the outer perimeter of an inner (bladder) wall which is received by a generally planar surface of an outer (trim) wall. The outer wall and/or inner surfaces may also include upstanding welding ribs that increase the weld strength by penetrating and fusing with the welding flange or other opposing surface during the hot welding process in which the areas to be welded are heated and then compressed. Despite the penetration of these ribs, weld separation has continued to be a potential failure mode for active bolsters for various reasons including warping of the parts to be welded, temperature variations of the hot plates during welding, uncorrected variances in the pressure applied during welding, and characteristic differences between the trim wall and bladder wall which may be molded from different plastic formulations.

Various stresses during inflation also contribute to the possibility of weld failure. Due to the elasticity required for making the pleated bladder wall inflatable, a significant peel stress may be applied to the weld seam during expansion. Another source of stress is the shock wave caused by the explosive initiation of gas flow from the inflator. Twisting and uneven bulging of the overall bladder structure during inflation can create stress or concentrate existing stresses at certain weld locations (e.g. along long straight edges of the weld).

SUMMARY OF THE INVENTION

In one aspect of the invention, an active bolster is provided for an interior trim surface of an automotive vehicle. A plastic-molded outer trim panel has a closed-loop welding section on an inside surface. A plastic-molded expandable bladder member has a central attachment section configured to attach to a support structure of the vehicle, a welding flange along a peripheral edge, and a pleated region between the central attachment section and the welding flange. The welding section and the welding flange are joined by a hot weld. An inflator couples an inflation gas into a space between the trim panel and bladder member to expand the bladder member in response to a crash event of the vehicle. The bladder member includes a first integrally-molded blocking rib projecting toward the trim panel between the welding flange and the pleated region. The trim panel includes a second integrally-molded blocking rib projecting toward the bladder member inside the welding section. The first and second blocking ribs mechanically interlock to resist separation of the bladder member and the trim panel during expansion and to shield the hot weld from the inflation gas.

DETAILED DESCRIPTION OF PREFERRED EMBODIMENTS

Figure 1:
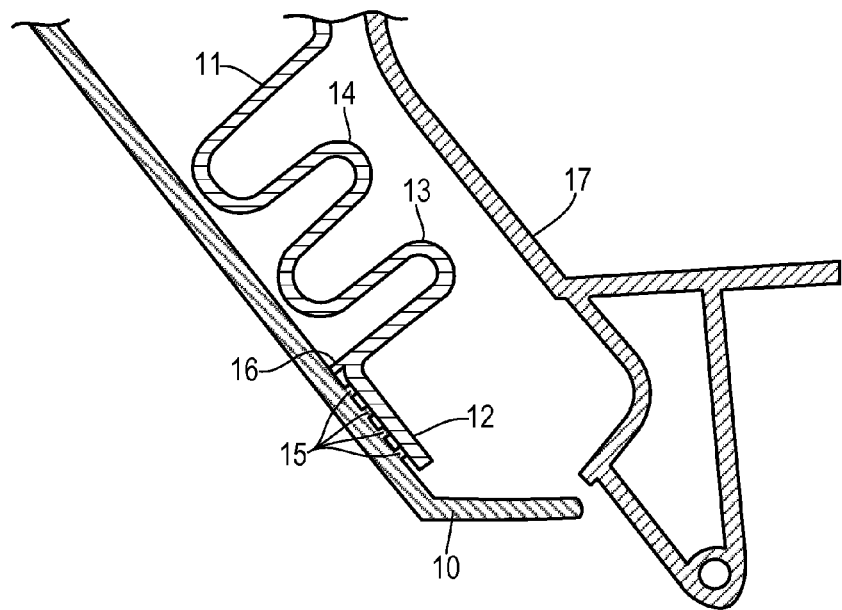
FIG. 1 is a cross section of a portion of a prior art active bolster showing a weld seam protected by a blocking rib formed on the bladder wall.

Referring to FIG. 1, a plastic-molded outer trim wall 10 overlies an expandable inner bladder wall 11 with a welding flange 12 disposed at its outer perimeter and a pleated region with pleats 13 and 14 bending inward from flange 12. This active bolster may comprise an active glove box door with a pivotable inner door panel 17 acting as a reaction surface to which bladder wall 11 is mounter.

Outer wall 10 has sealing ribs 15 that have been joined to welding flange 12 by hot welding. Inner wall 11 further includes a blocking rib 16 that extends from wall 11 between flange 12 and pleat 13 into abutment with outer wall 10. Blocking rib 16 may preferably extend for a full circumference around inner wall 11 at an inside edge of welding flange 12. Due to its abutment with outer wall 10, blocking rib 16 restricts the flow of inflation gas against welding flange 12 that could otherwise cause the weld to separate and fail. Blocking rib 16 may extend substantially transversely with respect to flange 12 in order to contact outer wall 10 and make a good sealing contact to prevent inflation gas from entering the weld. Blocking rib 16 may preferably be substantially co-planar with a side of outermost pleat 13. Even more preferably, blocking rib 16 may be compressed against outer wall 10 so that substantially no inflation gas flows past blocking rib 16. Consequently, the inflation gas pushes against the weld in a direction transverse to sealing ribs 15, which may correspond to the direction of greatest strength of the weld. In the event that displacement of pleat 13 during expansion causes blocking rib 16 to lose contact with outer wall 10, blocking of the inflation gas is lost.

Figure 2:
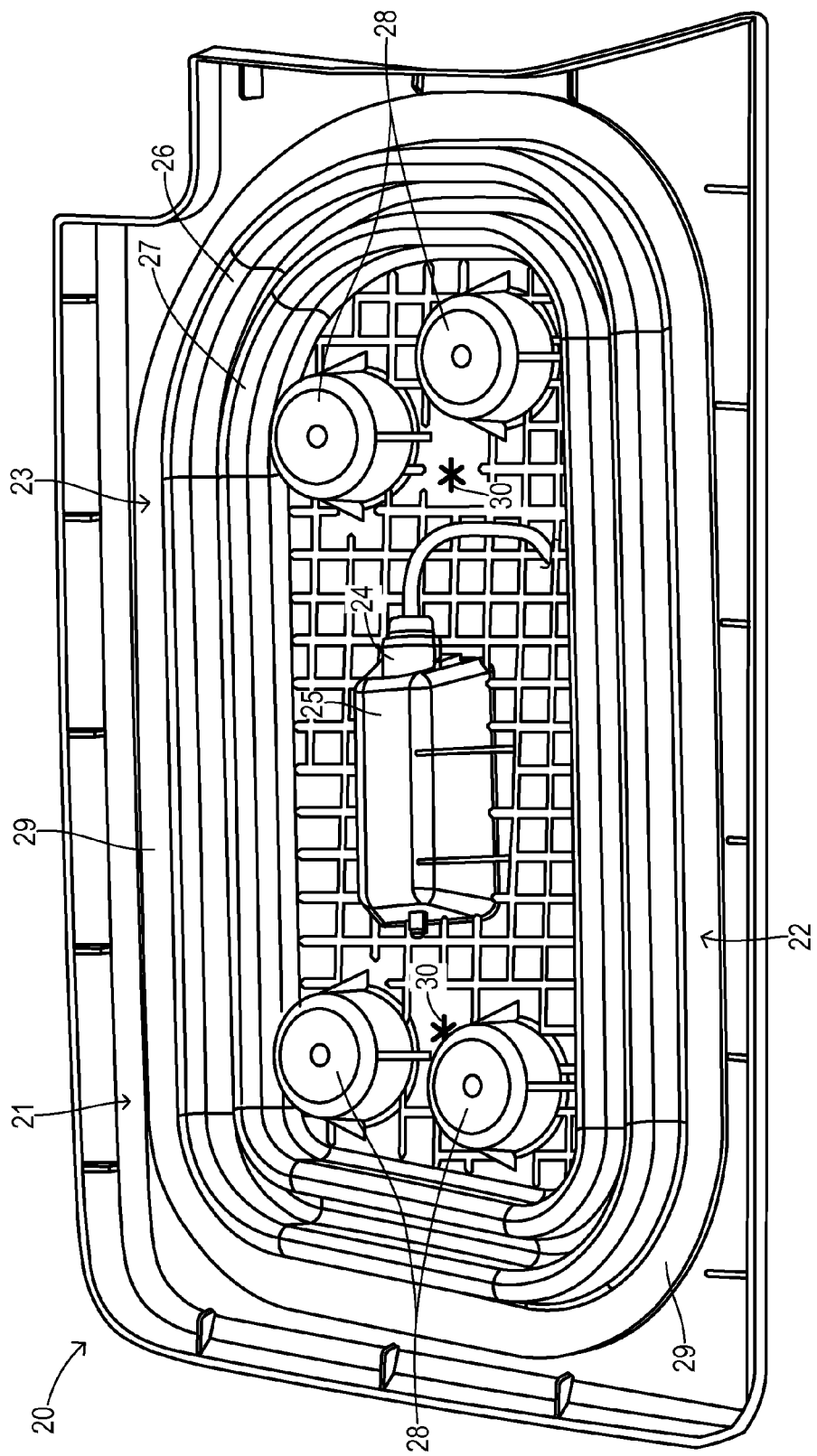
FIG. 2 is a rear perspective view of an outer trim panel and bladder wall assembly of a prior art active bolster.

FIG. 2 is a rear view of an active bolster 20. A plastic-molded outer trim panel wall 21 overlies a plastic-molded, expandable inner bladder wall 22. Walls 21 and 22 are joined around a closed perimeter region 23 to form an inflatable bladder having an open central volume between walls 21 and 22 to receive an inflation gas during a crash event from an inflator 24 mounted in a recess 25 of bladder wall 22. Bladder wall 22 includes a plurality of pleats, such as 26 and 27, to accommodate the expansion of bladder wall 22 during inflation. A plurality of bosses or towers 28 are used to mount bladder wall 22 to a vehicle support structure acting as a reaction surface. A welding flange 29 extends circumferentially around bladder wall 22. Vent holes 30 comprised of an asterisk-shaped pattern cut through bladder wall 22 may be included for venting the central volume prior to and during deployment. Other kinds of vents, such as an active vent, can also be employed.

Figure 3:
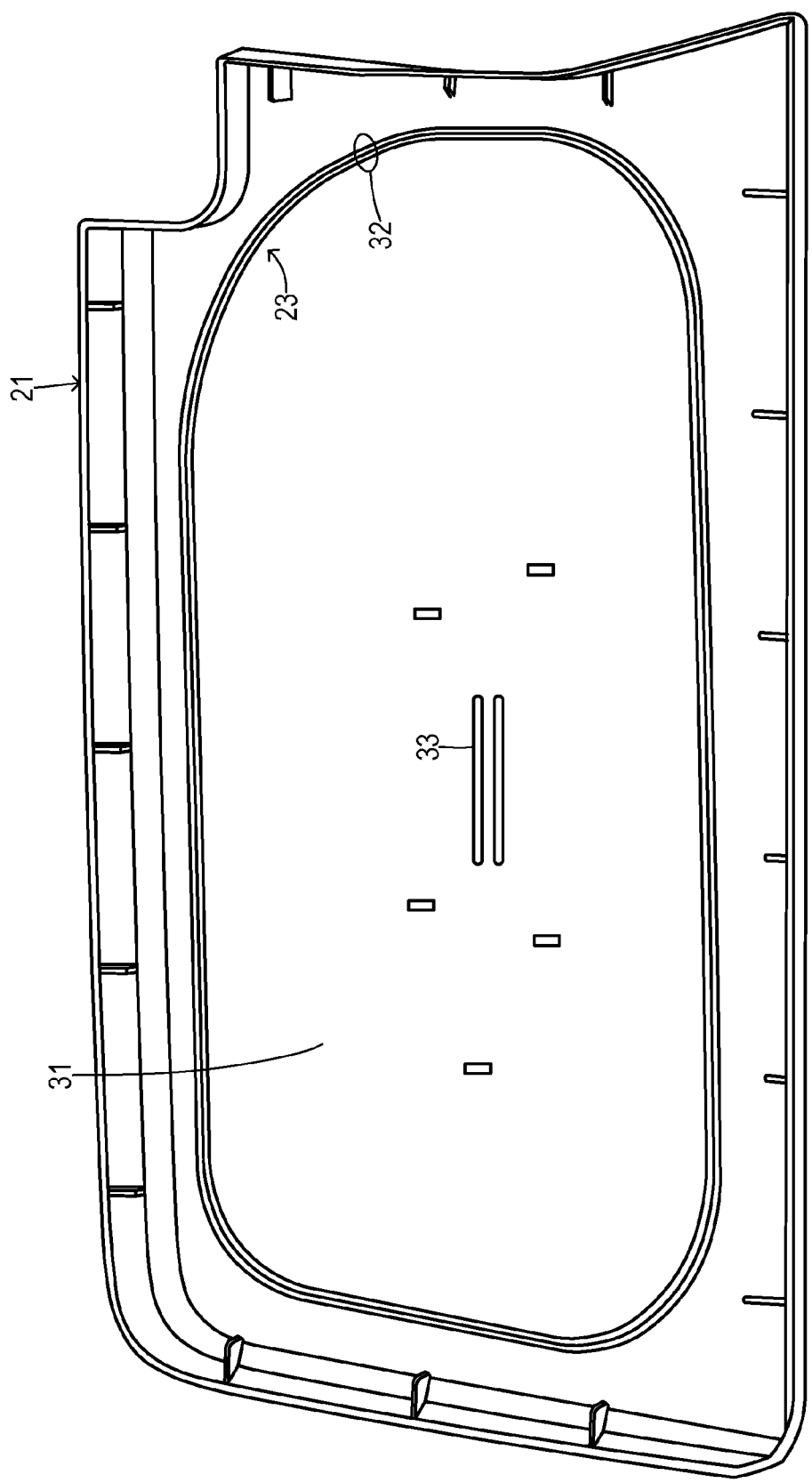
FIG. 3 is a perspective view of the prior art outer trim panel of FIG. 2 with the bladder wall removed.

FIG. 3 shows outer trim panel 21 with the inner bladder wall removed revealing an inner surface 31 that faces the bladder wall when assembled. A plurality of upstanding ribs 32 follow closed perimeter region 23 and are joined with flange 29 of inner bladder wall 22 (FIG. 2) by hot welding to create a hermetic seal for the inflatable bladder. Ribs 33 are provided for supporting the inflator.

Figure 4:
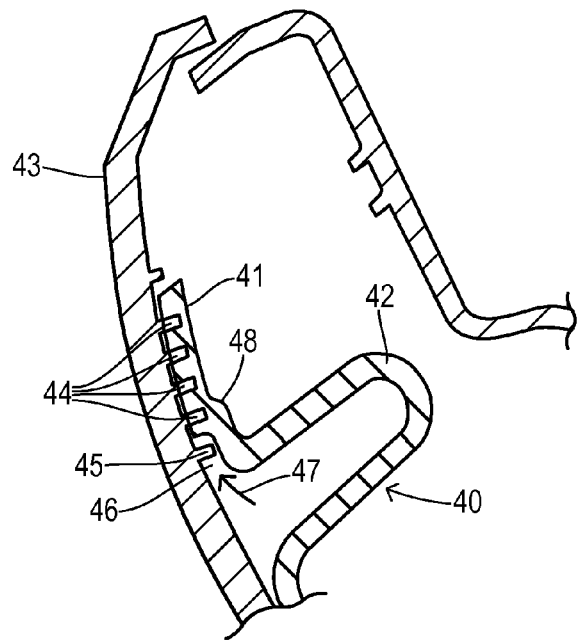
FIG. 4 is a cross-sectional view of a prior art active bolster showing a weld seam protected by a blocking rib formed on the outer trim panel.

FIG. 4 illustrates an alternative embodiment for a blocking rib, wherein a bladder member 40 has a welding flange 41 and a first (radially outermost) pleat 42. A trim panel 43 has a plurality of welding ribs 44 that penetrate and fuse with the heated plastic material of welding flange 41. A circumferential blocking rib 45 is disposed radially inward from welding ribs 44 and likewise extends inwardly toward bladder member 40. A hump 48 is preferably provided in bladder member 40 between welding flange 41 and pleat 42 to create a pocket 46 for accommodating blocking rib 45, whereby blocking rib 45 bears against bladder member 40 at a position radially outward of the pleats in order to block an inflation gas shock wave 47 from reaching the hot weld between flange 41 and welding ribs 44. During a welding operation when an active bolster is assembled, welding flange 41 is heated, welding ribs 44 may or may not be heated, and blocking rib 45 is not heated. Blocking rib 45 does not fuse with bladder member 40 (although the material of hump 48 may flow over blocking rib 45 filling or partially filling pocket 46).

Figure 5:
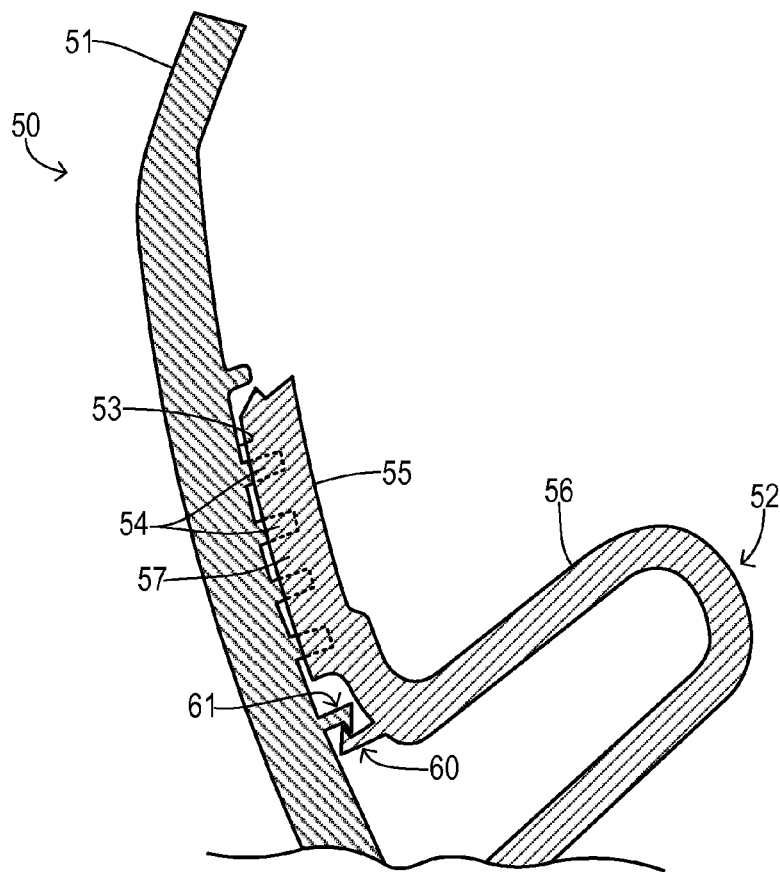
FIG. 5 is a cross-sectional view of one embodiment of the invention wherein interlocking blocking ribs are formed on both the bladder wall and trim panel.

FIG. 5 shows a first embodiment of an active bolster 50 of the present invention. A plastic-molded outer trim panel 51 has a closed-loop welding section 53 on an inside surface that receives a plastic-molded expandable bladder member 52. Welding section 53 of trim panel 51 includes welding ribs 54 for penetrating and forming a hot weld 57 with a welding flange 55 of bladder member 52. A pleated region 56 of bladder member 52 is disposed between welding flange 55 and a central attachment section (not shown). Hot weld 57 is formed in a known manner, including hot-plate welding and/or laser welding.

A blocking rib structure of the invention includes a first integrally-molded blocking rib 60 projecting from bladder member 52 toward trim panel 51 between flange 55 and pleated region 56. A second integrally-molded blocking rib 61 projects from trim panel 51 toward bladder member 52 inside welding section 53. Blocking ribs 60 and 61 are configured to mechanically interlock when trim panel 51 and bladder member 52 are brought together during hot welding. When interlocked, blocking ribs 60 and 61 will simultaneously A) resist separation of bladder member 52 from trim panel 51 during expansion, and B) shield hot weld 57 from the inflation gas that might otherwise tend to peel apart the weld.

Figure 6:
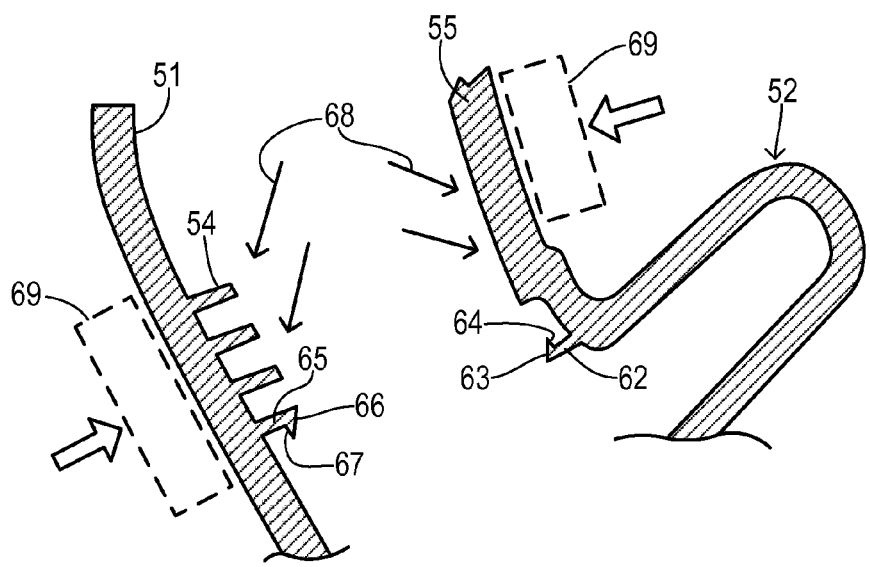
FIG. 6 is a cross-sectional view of the assembly of FIG. 5 during formation of the hot weld.

FIG. 6 shows trim panel 51 and bladder number 52 in the process of being hot welded together. Heat 68 is applied to welding ribs 54 and welding flange 55 (e.g. by contact with heated plates or illumination by laser radiation) prior to being pressed together by a fixture 69. Blocking ribs 60 and 61 are not significantly heated, but are instead mechanically interlocked when panel 51 and bladder number 52 are pressed together as follows. Blocking rib 60 has an elongated wall 62 with a sloped end surface 63 projecting laterally from wall 62 to form an intermediate latching surface 64. Blocking rib 61 is comprised of an elongated wall 65 having a complementary sloped end surface 66 and an intermediate latching surface 67. Sloped end surfaces 63 and 66 slidingly engage when trim panel 51 and bladder number 52 are pressed together during formation of the hot weld. Walls 62 and 65 are sufficiently flexible to be deflected laterally until sloped surfaces 63 and 66 most past each other. Then, walls 62 and 65 move partially back to their original positions and intermediate latch surfaces 64 and 67 snap together and prevent ribs 60 and 61 from separating. The mechanical interlocking in which blocking ribs 60 and 61 continue to press against each other results in an airtight seal that blocks inflation gas from reaching hot weld 57 during bladder inflation in a crash event.

A blocking rib or ribs may or may not extend around the full perimeter of the hot weld. It may be desirable in some cases to extend the mechanically-interlocking blocking ribs along only a portion of the periphery of the hot weld (e.g., in just the areas that would otherwise be subject to a highest stress during expansion). For example, a typical weld seam may follows a generally-rectangular profile with a pair of long horizontal edges and a pair of short vertical edges. In an active glove box door, for example, the longer horizontal dimension of the generally-rectangular profile corresponds to the side-to-side distance necessary to accommodate both knees of a seated vehicle occupant. When the pleated material of a bladder elongates during inflation, a highest peel stress tends to occur at central portions of the long edges. Due to the higher stress, prior art bolsters have had an increased potential for weld failure along the central portions.

Figure 7:
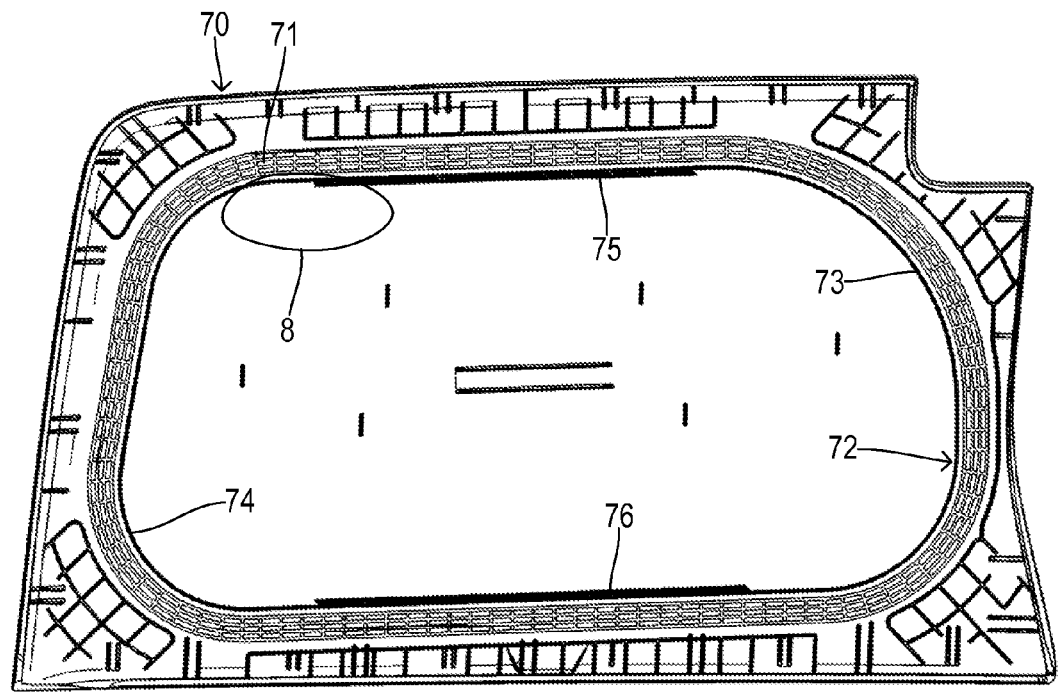
FIG. 7 is a rear perspective view of an embodiment of an outer trim panel wherein an interlocking portion of the blocking ribs is disposed only along a portion of the weld periphery which would otherwise be subject to the highest stress.

FIG. 7 shows an inside surface of a trim panel 70 having welding ribs in a closed-loop welding section 71. A blocking rib 72 preferably follows a complete closed-loop path disposed inside of welding section 71, but may be configured for mechanical locking only at portions of the hot weld otherwise subject to a highest stress during expansion (i.e., along the long horizontal edges). Thus, blocking rib 72 has vertical side portions 73 and 74 that lack mechanical interlocking and horizontal top and bottom portions 75 and 76 configured for mechanical interlocking with complementary mating ribs on a bladder member (not shown).

Figure 8:
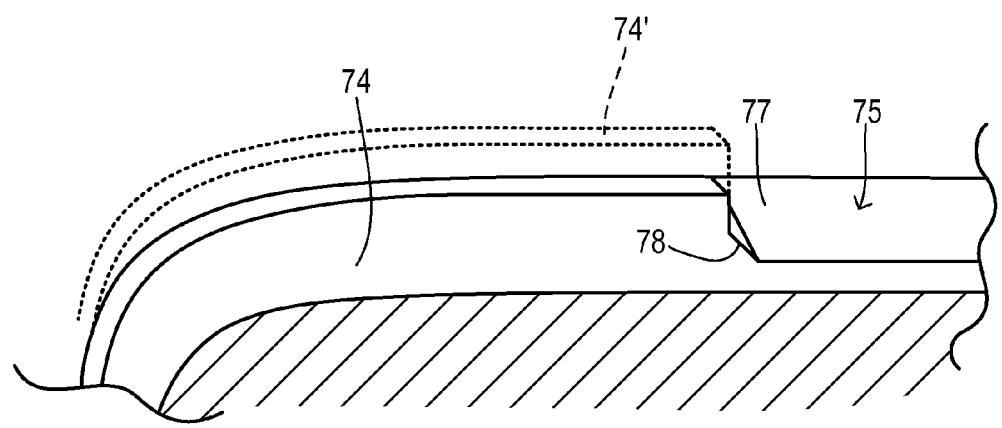
FIG. 8 is a rear perspective view showing a portion of the outer trim panel as indicated in FIG. 7 in greater detail.

FIG. 8 shows blocking rib portions 74 and 75 in greater detail. Interlocking portion 75 includes a sloped end 77 and a latching surface 78. Non-interlocking portion 74 may have a height which is the same as portion 75 or may be taller (as shown by dashed lines 74') or shorter depending upon how it contacts the bladder member (e.g., whether it contacts a non-interlocking rib or whether it contacts a flat area on the bladder member).

What is claimed is:

1. An active bolster for providing an interior trim surface of an automotive vehicle, comprising:
    a plastic-molded outer trim panel having a closed-loop welding section on an inside surface; and
    a plastic-molded expandable bladder member having a central attachment section configured to attach to a support structure of the vehicle, a welding flange along a peripheral edge, and a pleated region between the central attachment section and the welding flange, wherein the welding section and the welding flange are joined by a hot weld; and
    an inflator for coupling an inflation gas into a space between the trim panel and bladder member to expand the bladder member in response to a crash event of the vehicle;
    wherein the bladder member includes a first integrally-molded blocking rib projecting toward the trim panel between the welding flange and the pleated region;
    wherein the trim panel includes a second integrally-molded blocking rib projecting toward the bladder member inside the welding section; and
    wherein the first and second blocking ribs mechanically interlock to resist separation of the bladder member and the trim panel during expansion and to shield the hot weld from the inflation gas.

2. The active bolster of claim 1 wherein the first and second blocking ribs extend peripherally along a portion of the hot weld otherwise subject to a highest stress during expansion.

3. The active bolster of claim 1 wherein the first and second blocking ribs are each comprised of an elongated wall having a sloped end surface and an intermediate latch surface, wherein the sloped end surfaces engage to deflect the blocking ribs during formation of the hot weld to permit engagement of the latch surfaces.

4. An active bolster comprising:
    a trim panel having a peripheral welding section and a first blocking rib; and
    a bladder member attachable to a vehicle and including a peripheral flange welded to the welding section, a pleat, and a second blocking rib between the flange and pleat;
    wherein the blocking ribs mechanically interlock to resist separation of the bladder member and trim panel during expansion and to shield the weld from inflation gas.

5. The active bolster of claim 4 wherein the first and second blocking ribs are each comprised of an elongated wall having a sloped end surface and an intermediate latch surface, wherein the sloped end surfaces engage to deflect the blocking ribs during formation of the weld to permit engagement of the latch surfaces.

* * * * *